(12) United States Patent
Zhang et al.

(10) Patent No.: US 12,090,628 B2
(45) Date of Patent: *Sep. 17, 2024

(54) AUTONOMOUS ROBOTIC SYSTEM FOR PLACING AND FASTENING PANELING MATERIAL FOR BUILDING CONSTRUCTION OPERATIONS

(71) Applicant: Purdue Research Foundation, West Lafayette, IN (US)

(72) Inventors: Jiansong Zhang, Lafayette, IN (US); Christopher M Lacny, Indian Head Park, IL (US); Noah Reardon, Chicago, IL (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,507

(22) Filed: Aug. 31, 2023

(65) Prior Publication Data
US 2023/0415351 A1 Dec. 28, 2023

Related U.S. Application Data

(63) Continuation of application No. 17/223,111, filed on Apr. 6, 2021, now Pat. No. 11,745,356.
(Continued)

(51) Int. Cl.
*B25J 9/16* (2006.01)
*B25J 9/12* (2006.01)
(Continued)

(52) U.S. Cl.
CPC ........... *B25J 11/0055* (2013.01); *B25J 9/123* (2013.01); *B25J 9/126* (2013.01); *B25J 9/1676* (2013.01);
(Continued)

(58) Field of Classification Search
CPC . B25J 9/123; B25J 9/126; B25J 9/1676; B25J 9/1697; B25J 11/005; B25J 11/0055; B25J 13/085; B25J 15/0019
See application file for complete search history.

(56) References Cited

U.S. PATENT DOCUMENTS

2009/0018700 A1* 1/2009 Okamoto ............... B25J 13/083
901/9
2010/0057242 A1* 3/2010 Williams ............... B27F 7/006
700/114
(Continued)

*Primary Examiner* — Dale Moyer
(74) *Attorney, Agent, or Firm* — Piroozi-IP, LLC

(57) ABSTRACT

An autonomous construction robotic system is disclosed which includes a processing unit, a robotic arm, the robotic arm is adapted to be coupled to a central attachment arm and thereby position the central attachment arm according to a plurality of degrees of freedom, a panel handling and fastening system, including a panel handling assembly coupled to the central attachment arm and adapted to pick and place a construction panel onto a framed structure within a construction zone, and a vision system adapted to provide visual information to the processing unit associated with the framed structure, wherein the processing unit processes the visual information to automatically determine placement position of the construction panel on the framed structure.

19 Claims, 8 Drawing Sheets

Related U.S. Application Data

(60) Provisional application No. 63/006,674, filed on Apr. 7, 2020.

(51) Int. Cl.
  *B25J 11/00* (2006.01)
  *B25J 13/08* (2006.01)
  *B25J 15/00* (2006.01)
  *B25J 15/06* (2006.01)

(52) U.S. Cl.
  CPC .......... *B25J 9/1697* (2013.01); *B25J 13/085* (2013.01); *B25J 15/0019* (2013.01); *B25J 15/0616* (2013.01)

(56) References Cited

U.S. PATENT DOCUMENTS

| | | | |
|---|---|---|---|
| 2017/0114553 A1* | 4/2017 | Raman | B25J 5/007 |
| 2018/0283019 A1* | 10/2018 | Telleria | B24B 55/06 |
| 2020/0024853 A1* | 1/2020 | Furrer | B25J 9/163 |

* cited by examiner

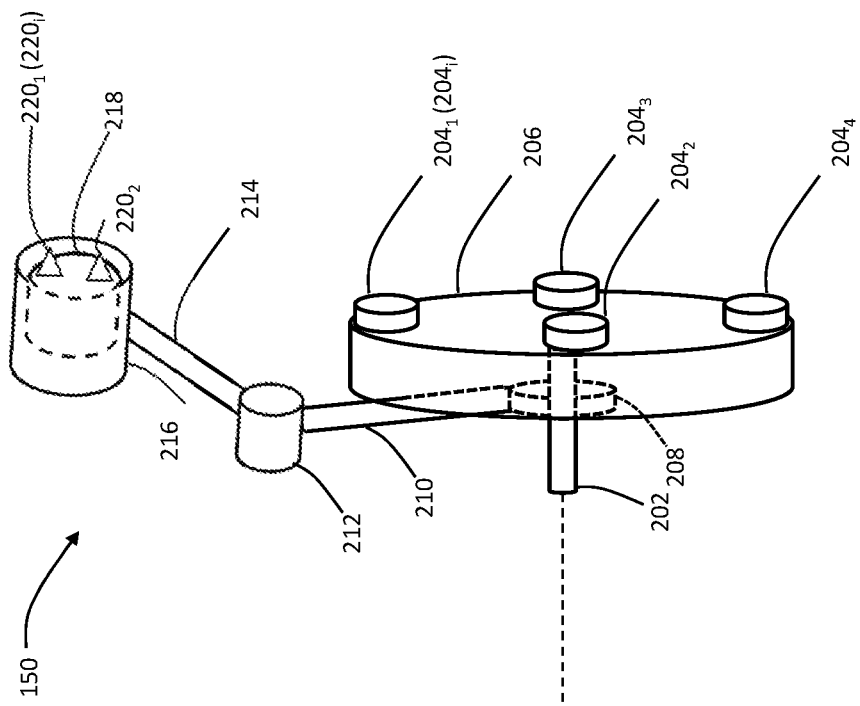
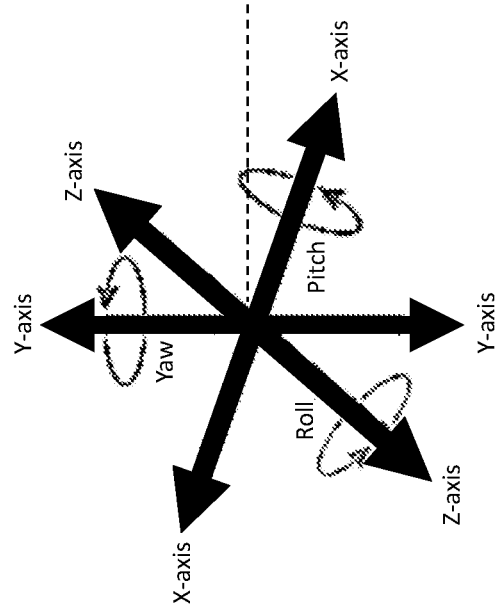
FIG. 2

AUTONOMOUS ROBOTIC SYSTEM FOR PLACING AND FASTENING PANELING MATERIAL FOR BUILDING CONSTRUCTION OPERATIONS

CROSS-REFERENCE TO RELATED APPLICATIONS

The present patent application is a continuation of U.S. Non-Provisional patent application Ser. No. 17/223,111 filed Apr. 6, 2021, which is related to and claims the priority benefit of U.S. Provisional Patent Application Ser. No. 63/006,674 filed Apr. 7, 2020, the contents of each of which are hereby incorporated by reference in its entirety into the present disclosure.

STATEMENT REGARDING GOVERNMENT FUNDING

This invention was made with government support under 1827733IIP awarded by National Science Foundation. The government has certain rights in the invention.

TECHNICAL FIELD

The present disclosure generally relates to construction technology, and in particular, to an autonomous or a semi-autonomous robotic system capable of attaching paneling on the framed walls in a construction setting.

BACKGROUND

This section introduces aspects that may help facilitate a better understanding of the disclosure. Accordingly, these statements are to be read in this light and are not to be understood as admissions about what is or is not prior art.

For many decades now, construction in residential and commercial buildings involve erecting framed walls; and once the framing operation is complete to hang paneling material on the interior surfaces as well as exterior surfaces. These paneling materials include drywall as well as other paneling materials such as foam. The paneling material are typically in standard sizes and tend to be heavy. For example a typical ⅝" drywall is about 2.2 Lb/ft$^2$ making a sheet of 4 ft by 10 ft approximately 88 Lbs. Such a weight is difficult to lift for a worker, in addition to the sheer size of such a panel, making handling a panel of this size challenging, particularly when installing such a panel on a ceiling. A typical operation requires at least two individuals where one or both place the panel at an appropriate place and quickly fasten using, typically nails, until the panel is securely attached to the framed wall or ceiling. Thereafter, the worker(s) begin to fasten the drywall panel with additional fasteners which are typically drywall screws. The nails, however, have a tendency of popping out after a period of time making imperfections on the surface of the drywall. In addition, it is quite difficult to maintain a high level of consistency in the way the screws are placed in the drywall panel, thereby making the finishing more difficult.

To alleviate some of the aforementioned challenges, a drywall lift is generally utilized. A drywall lift includes a platform upon which a panel of drywall is placed. Thereafter, a large wheel is rotated to lift the panel to a proper height. While such a lift allows an easier operation for the worker, the operation is even more time-consuming. Additionally, the drywall lift is bulky and difficult to manipulate.

while, in the last 30 years, worker productivity (measured in output per worker hour) in the manufacturing sector has increased by 120%, primarily due to advances in and adoption of automation technologies, worker productivity in single family home construction has been stagnant, increasing by only 10% in the same period. This stagnation of productivity increase represents an unmet need.

Therefore, there is an unmet need for a novel approach and system that can place paneling materials on framed walls in a construction environment that overcomes the aforementioned challenges.

SUMMARY

An autonomous construction robotic system is disclosed. The system include a processing unit. The system further includes a robotic arm. The robotic arm is adapted to be coupled to a central attachment arm and thereby position the central attachment arm according to a plurality of degrees of freedom. The system also includes a panel handling and fastening system which includes a panel handling assembly coupled to the central attachment arm and adapted to pick and place a construction panel onto a framed structure within a construction zone. The system further includes a vision system adapted to provide visual information to the processing unit associated with the framed structure, wherein the processing unit processes the visual information to automatically determine placement position of the construction panel on the framed structure.

BRIEF DESCRIPTION OF DRAWINGS

FIG. 2 is a perspective schematic view of the panel handling and fastening system of FIG. 1.

DETAILED DESCRIPTION

Figure 1:
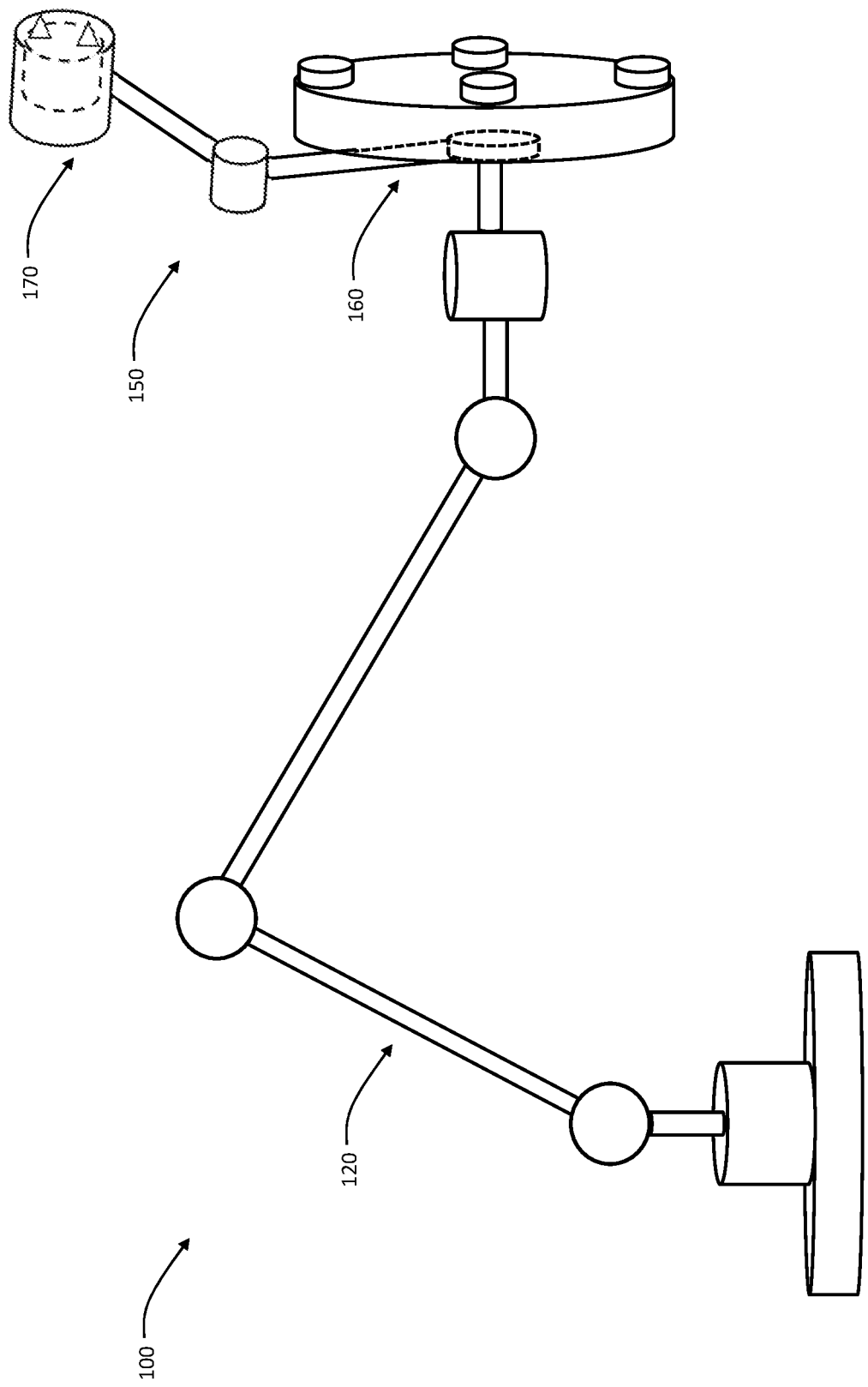
FIG. 1 is a schematic of a robotic arm system for placing and fastening paneling material on framed walls and ceilings, including a panel handling and fastening system, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach and system is disclosed herein that can place paneling materials on framed walls in a construction environment. Towards this end, the novel system of the present disclosure includes an autonomous or a semi-autonomous robotic system which includes a computer vision system that can automatically i) locate a framed wall/ceiling within a construction zone, ii) establish a local coordinate system with respect to the framed wall/ceiling, iii) pick up a panel (e.g., a panel of drywall) from a stack of paneling positioned near the robotic system, iv) place the panel against the framed wall/ceiling, v) partially or completely fasten the panel against the framed wall/ceiling, vi) cut excess portions of the panel while the panel is fastened on the framed wall/ceiling, vii) remove the excess portions of the panel and place in a location where debris from construction can be accumulated, and viii) complete fastening the panel if needed. The robotic system of the present disclosure is further and optionally configured to receive a building information modeling data file, known to a person having ordinary skill in the art, which includes framing information of walls within a structure; and use sensors mounted on the robotic system to make measurements and generate a report of quality of construction for the structure. Such sensors include a wide range of technology including micropower impulse radar, capacitive sensors that detect changes in wall density, and force sensors that can be used to precisely locate the vertical members (called studs) within a framed wall/ceiling.

As mentioned, the novel system of the present disclosure is based on a robotic system. Typical industrial robotic arms are designed to operate in a tightly controlled environments, and typically utilize only a limited sensing capability which is tailored to a specific and narrow task. However, an associated computer system which controls such a robot, conventionally has a limited ability to handle unexpected conditions and will halt operation if too large a deviation from expected conditions are encountered.

Standard industrial robotic arm systems also generally lack the ability to both manipulate and fasten a piece of material with a single manipulator arm, instead relying on multiple manipulators to accomplish such a task. This limits the portability and flexibility of such systems, and increases both cost and complexity of the electronic controls.

To alleviate the challenge of using a standard robotic system, the present disclosure provides a description of i) a robotic handling unit, ii) a robotic arm, and iii) an end effector that are all coupled to a central attachment arm and are all further configured to work in concert with one-another in order to achieve the aforementioned goals of the novel robotic system of the present disclosure. The central attachment arm is coupled to a commercially available robotic system capable of generating motion in six degrees of freedom. Six degrees of freedom represent the minimum degrees of freedom needed to reach a volume of space from every available angle. Therefore, a system that can provide six degrees of freedom can preferentially reach each available angle to install a panel on a framed wall/ceiling.

Referring to FIG. 1, a schematic of the novel robotic arm system 100 for placing and fastening paneling material on framed walls and ceilings is shown. The system includes two principal subsystems: (1) a robotic arm 120 that can preferably generate six degrees of freedom to a connecting component (although it is possible that a smaller number of degrees of freedom may also address the needs of certain constructions projects), and (2) a panel handling and fastening system 150 including a panel handling assembly 160 and an end effector assembly 170, which are both configured to be coupled to the robotic arm 120. The panel handling and fastening system 150 is further depicted in FIG. 2 which is a perspective schematic view of the panel handling and fastening system 150 and which includes a central attachment arm 202, which is coupled to a plate 206. On the plate 206 there are one or more paneling pickup tools $204_i$ (four are shown as $204_1$, $204_2$, $204_3$, and $204_4$, however, a smaller or larger number is also feasible). Example paneling pickup tools include suction cups coupled to a vacuum pump (not shown) drawing sufficient vacuum so as to overcome the weight of the panel. Example of weight of a 4 foot by 10 foot ⅝" inch of drywall was provided in the background section. Therefore, to calculate the necessary pressure, the proportional weight of the panel can be divided by opening area of the suction cup to establish the necessary pressure. For example, for an 88 Lbs drywall panel, being picked up by four suction cups of for example 6" each diameter, will require about 3.2 PSIG vacuum pressure: A 6" diameter suction cup has an area of 28.27 in$^2$, therefore four suction cups have an area of 113.1 in$^2$, thus to lift 88 pounds over an area of 113.1 in$^2$, a vacuum pressure of about 0.8 PSIG is needed—for vertical lifting, a factor of safety of four is recommended, that provides a required vacuum pressure of about 3.2 PSIG. The central attachment arm 202 is adapted to be coupled to the robotic arm. In one embodiment shown in FIG. 2, the robotic arm system 100 shown in FIG. 1 is adapted to provide six degrees of freedom. These degrees of freedom are shown in FIG. 2 and include motion in the XYZ axis as well as roll (rotation about the Z-axis), pitch (rotation about the X-axis), and yaw (rotation about the Y-axis). The central attachment arm 202 is further coupled to the plate 206 such that motion of the central attachment arm 202 correspondingly moves the plate 206 and the one or more paneling pickup tools $204_i$ mounted thereon. The central attachment arm 202 is further coupled to a first actuator 208 which is then coupled to a first arm 210. The first actuator 208 is a rotational actuator, e.g., a stepper motor, known to a person having ordinary skill in the art, which can rotate the first arm 210 independent of the plate 206. The first arm 210 is further coupled to a second actuator 212 which is another rotational actuator, e.g., a stepper motor. The second actuator 212 is further coupled to a second arm 214 which together with the first arm 210, and the first actuator 208 provide two additional degrees of freedom for the panel handling and fastening system 150. Coupled to the second arm 214 are two additional actuators: a third actuator 216 which selectively engages a tool 2201. Example tools include a fastening tool 220$_1$ (e.g., a rotatory driver), and a cutting tool 220$_2$ (e.g., a cutting bit with an optional vacuum to first cut and further draw cutting dust from the surrounding air). The tools 2201 are coupled to a rectilinear actuator 218 which allow a rectilinear advancement of the tools 2201 utilizing, e.g., a conventional rack-and-pinion mechanism.

Figure 3:
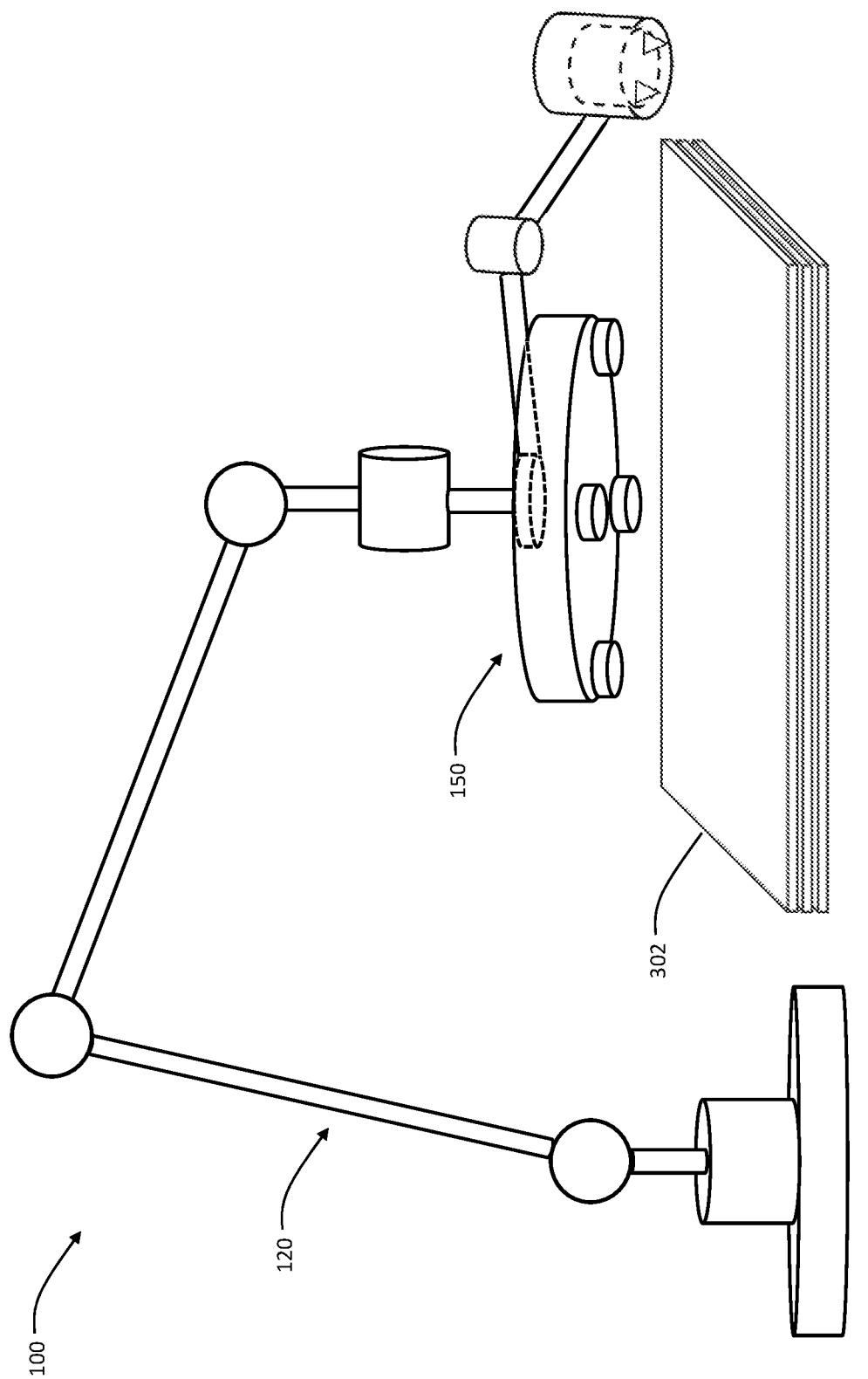
FIGS. 3, 4, and 5 depict operation of the robotic arm system of FIG. 1.
Figure 4:
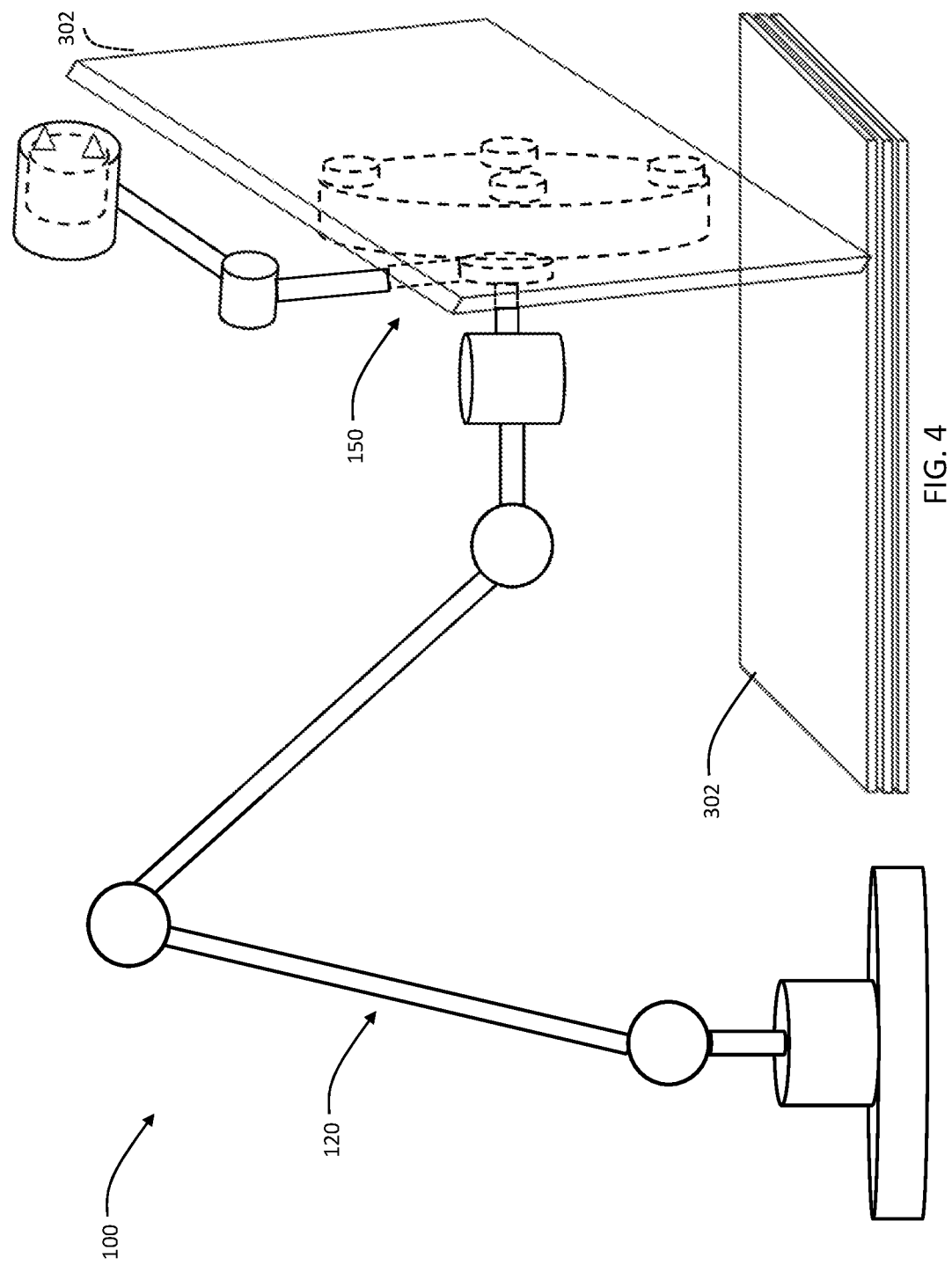
Figure 5:
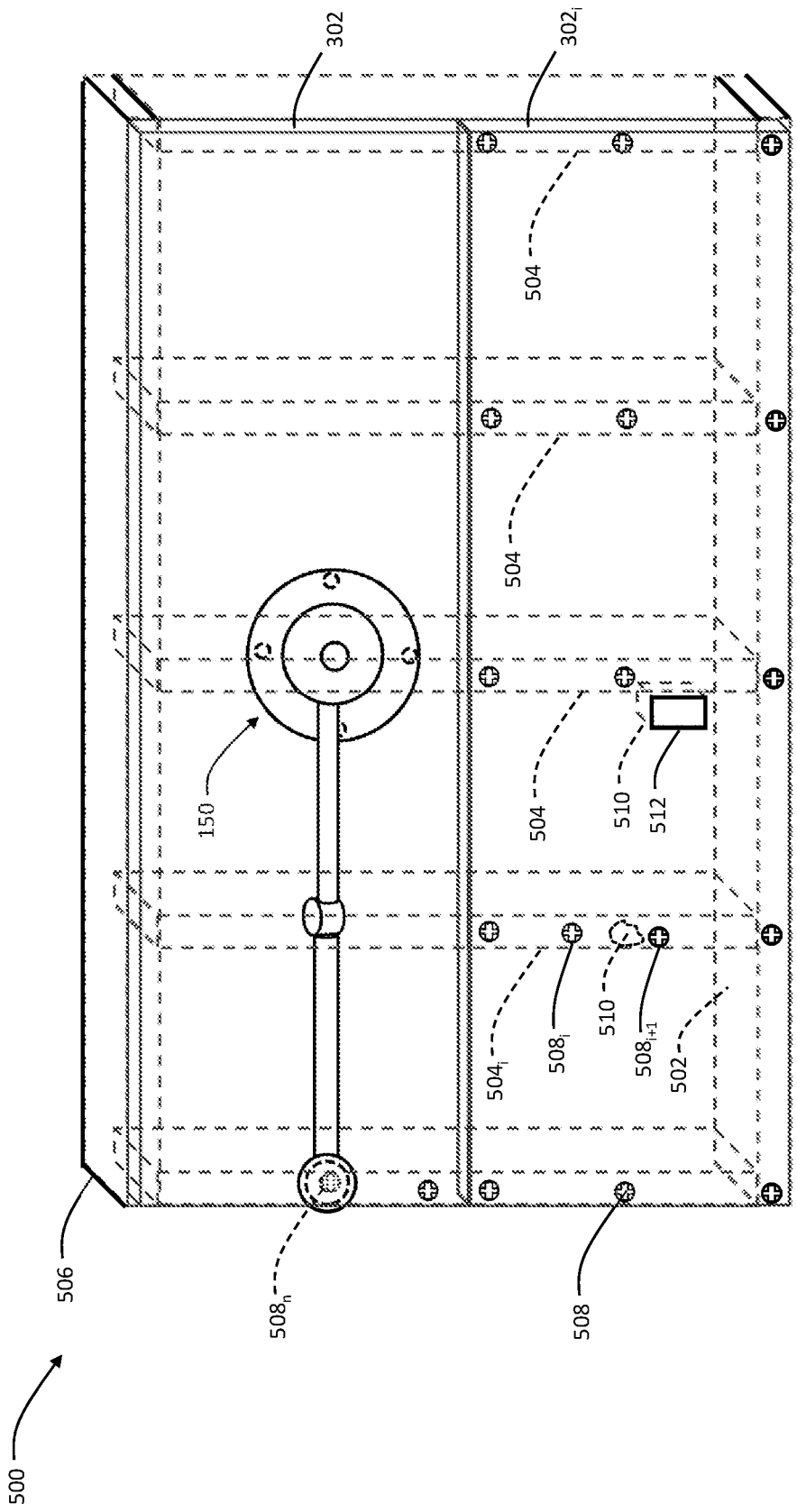

Referring to FIGS. 3, 4, and 5 operation of the robotic arm system 100 is provided. Referring to FIG. 3, the robotic arm 120 positions the panel handling and fastening system 150 above a stack of panels 302 until the plate 206 (see FIG. 2) and the paneling pickup tools $204_i$ are firmly and centrally positioned atop the panel 302. Once vacuum is applied to the paneling pickup tools $204_i$, the robotic arm 120 positions the panel handling and fastening system 150 in the appropriate orientation and position (for example vertically for installation onto a wall or horizontally for installation onto a ceiling), as shown in FIG. 4, which shows the panel handling and fastening system 150 holding the panel 302 vertically ready for attachment on to a framed wall. Referring to FIG. 5, the panel handling and fastening system 150 is shown placing the panel 302 onto a wall above a second panel 302 which has already been installed. The framed wall includes a bottom plate 502 and a top plate 506, in between the two are a plurality of studs 504 which are placed at a nominal and repeated distance from each other (e.g., 16" on the center). The already installed panel 302 is fastened with a plurality of fasteners 508 positioned according to a fastening schedule based on an operation plan, discussed further below. FIG. 5, further shows the panel handling and fastening system 150 in operation in a work area paneling a framed wall 500 where the first actuator 208, and the second actuator 212 have been actuated such that the first arm 210, the second arm 214, and the third actuator are extended away from the central attachment arm 202 to the edge of the panel 302, placing a new fastener $508_n$.

In this setting, the panel handling and fastening system 150 has applied vacuum to the paneling pickup tools $204_i$ (see FIG. 2) so as to enable the panel handling and fastening system 150 pick up the panel 302 (see FIG. 4), utilize a vision system, described below, properly place the panel 302 (see FIG. 4) against the framed wall 500 and begin fastening the panel 302 (see FIG. 4) against the framed wall 500.

Figure 6:
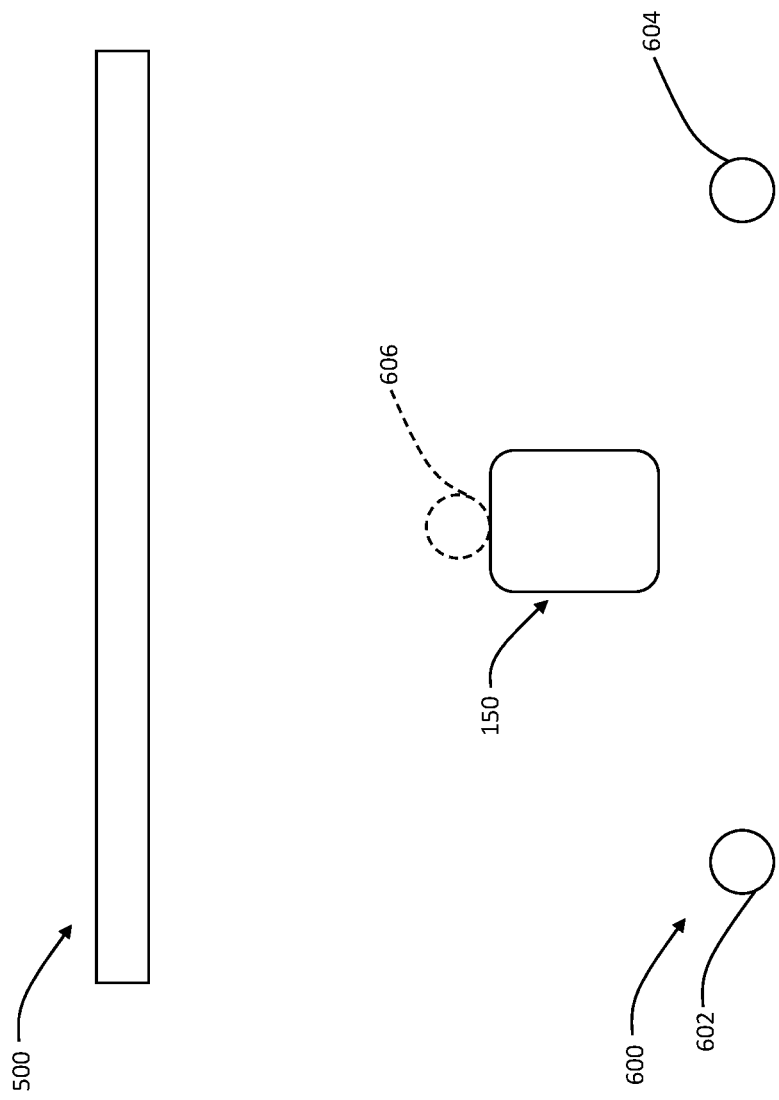
FIG. 6 is a general schematic of a vision system with respect to the panel handling and fastening system of FIG. 1.

The panel handling and fastening system 150 is adapted to cooperatively interact with a vision system 600. Referring to FIG. 6 a general schematic of the vision system 600 is shown with respect to the panel handling and fastening system 150. The vision system 600 may constitute two single-vision cameras 602 and 604. These single-vision cameras 602 and 604 may be positioned at a predetermined distance away from the framed wall 500 and from the panel handling and fastening system 150. Using a coordinate translation approach, images from each of the single-vision cameras 602 and 604 can be used to establish a depth for objects away from the panel handling and fastening system 150, as known to a person having ordinary skill in the art. To utilize this coordinate translation approach, same objects in images from each of two single-vision cameras 602 and 604 are associated with one-another and the depth of the object from a central point (e.g., a point on the panel handling and fastening system 150) is thus calculated. According to one embodiment, at least one of the two single-vision cameras 602 and 604 is an RGB (red, green, blue) camera. The purpose for this embodiment is to analyze the color of the image from this RGB camera in order to determine flaws in the construction material. It is common for wooden studs 504 (see FIG. 5) to have knots. Alternatively, where there are plumbing fixtures and/or electrical conduits passing through studs 504 (see FIG. 5), there may be metallic plates (not shown) pre-attached to the studs (see FIG. 5) which represent locations where fasteners $508_n$ (see FIG. 5) should not be attached. To identify these features (i.e., fastener forbidden zones), a color analysis of the images of at least one RGB camera is needed. To do this color analysis, each pixel of each image of the RGB camera is compared to neighboring pixels to determine a difference greater than a predetermined threshold. Such a difference would represent a variance in material that can be categorized as defects, metallic plates, or other issues with the studs 504 (see FIG. 5). The panel handling and fastening system 150 includes a processing unit, discussed below, which receives images from the single-vision cameras 602 and 604 and analyzes those images to determine such forbidden zones for fastening the panel 302 (see FIG. 5) to the studs 504 (see FIG. 5). When such forbidden zones are determined by the processing unit, described below, the processing unit using the images from the single-vision cameras 602 and 604 determines the closest location on the studs 504 (see FIG. 5) which away from the established forbidden zone. This location may be above or below the pre-scheduled location for fastening the fastener $508_n$ (see FIG. 5).

This mapping of the framed wall 500 is performed and logged into memory of the processing unit, described below, prior to the placement of the panel 302 (see FIG. 5) onto the framed wall 500. This sequence of imaging and logging forbidden zones according to the present disclosure, is extremely advantageous as a manual operation for hanging panels that represents the state of the art for the last several decades suffers from not knowing the location of these defects and/or electrical and plumbing fixtures, once the panel is placed on the framed wall. This challenge with the existing prior art is because once the panel is placed on the framed wall, the panel blinds these areas from sight of the workers. Therefore, the workers have to make exact measurements as to where such forbidden zones are. For example on a 4 foot by 10 foot panel, the worker has to make a precise measurement on a stud that is only 1½" wide, representing an exceedingly difficult task.

Referring back to FIG. 5, this operation of avoiding a forbidden zone is depicted. Suppose the panel handling and fastening system 150 is scheduled to place a fastener $508_i$ at a predetermined location on the stud $508_i$. Prior to attaching the panel $302_i$ to the famed wall 500, the vision system 600 (see FIG. 6) generates an image of the stud $508_i$ which is analyzed by the processing system, described below, as having a deformity 510, e.g. a hole or a knot, in the stud $504_i$ which is a common occurrence with wooden studs. The location of the deformity happens to coincide with the predetermined location of fastening the fastener $508_i$. The processing system, described below, based on proximity to other deformities or other obstructions, such as an electrical or plumbing fixture may determine to place the fastener $508_i$ at a higher position and further provide an additional fastener $508_{i+1}$ at a lower position as compared to deformity 510.

Referring back to FIG. 6, the vision system 600 also logs into memory of the processing unit, described below, the location of electrical junction boxes (in construction terminology referred to as gangboxes). A gangbox is often installed on a stud with only a fraction of the gangbox protruding away from the stud. This type of disposition, represents a more serious challenge for panel hangers of the prior art. The challenge stems from not knowing the location of the gangbox and thus inadvertently paneling over the gangbox. Thereafter, when an electrician returns to complete the final electrical connections, the gangbox is hidden behind the panel. This requires the electrician to search for the gangbox by making exploratory holes in the panel which will need to be filled and patched.

The vision system 600 of the present disclosure alleviates the aforementioned challenge. Each gangbox is identified via an image analysis of the single-vision cameras 602 and 604 and the outline of each gangbox is identified on the studs. This identification is shown in FIG. 5. A gangbox 510 is shown on a stud 504. Prior to attachment of the panel 302 onto the framed wall 500, an outline 512 of the gangbox 510 is analyzed from the single-vision cameras 602 and 604 and logged into memory of the processing unit, described below, for later processing (including cutting around the gangbox 510 about its outline 512, as described further below).

While two single-vision cameras 602 and 604 are shown in FIG. 6, an alternative approach may also be implemented with a single RGB-Depth camera 606. An RGB-Depth camera, not only generates a RGB image, but for each pixel generates a distance away from the camera of the object of which the pixel represents. That is, instead of only a triple dataset output for each pixel (one for red, one for green, and one for blue), generally obtained from a regular RGB camera (e.g., one or both of the single-vision cameras 602 and 604 as discussed above according to one embodiment), the RGB-Depth camera 606 provides a dataset including four pieces of information including RGB and depth of the pixel. This RGB-Depth camera 606 can be installed on the panel handling and fastening system 150, as shown in FIG. 6, or at a fixed location away (not shown) from the panel handling and fastening system 150. In either case, using a coordinate translation technique, known to a person having ordinary skill in the art, the depth of each stud 504 (see FIG. 5), and the characteristics of each stud 504 (see FIG. 5) including locations of knots, holes, electrical and plumbing fixtures, and gangboxes can be ascertained by the processing unit, described below, and logged into memory prior to attaching a corresponding panel 302 (see FIG. 5) onto the framed wall 500.

As described above, and further with reference back to FIG. 2, tools $220_i$ are used to attach and augment the panel 302 (see FIG. 5). One such tool $220_2$ is a cutting tool which includes a specialty drill bit that is used for cutting panels 302 (see FIG. 5). From time-to-time, a panel 302 (see FIG. 5) may need to be augmented. This augmentation may include cutting the size of the panel 302 (see FIG. 5) to fit an area smaller than the un-augmented size of the panel 302 (see FIG. 5); or to reveal a gangbox 510 (see FIG. 5). For revealing a gangbox 510 (see FIG. the specialty drill bit of the tool $220_2$ includes a non-cutting end that is intended to pierce the panel 302 (see FIG. 5) and while in contact with outside of the outline 512 (see FIG. 5) of the gangbox 510 (see FIG. 5) trace the outline 512 (see FIG. 5) while cutting the panel 302 (see FIG. The tool $202_i$ may further include a vacuum attachment so as to remove cutting dust from the surrounding air while cutting, as described below. In addition, the tool $220_i$ may include a pickup tool (not shown) similar to the pickup tool $204_i$ for capturing the cut portion and disposing of that cut portion in a disposal area.

The tool $202_i$ may also be used to cut the panel 302 (see FIG. 5) down to an appropriate size. This cutting can be performed by placing oversized panel 302 (see FIG. 5) on the framed wall 500 using only a few fasteners 508 (see FIG. 5), in a manner that allows the oversized panel to overhang previously fastened panels. Then the panel handling and fastening system 150 can determine the precise position of cuts by the processing unit, described below, using the tool $220_2$ cut the excess part of the panel, optionally vacuuming dust from the surrounding air, and remove the cut portion into the disposal area. The panel handling and fastening system 150 can then proceed by fastening the additional fasteners 508 (see FIG. 5) according to the previously determined fastening pattern determined by the processing unit, described below.

Figure 7:
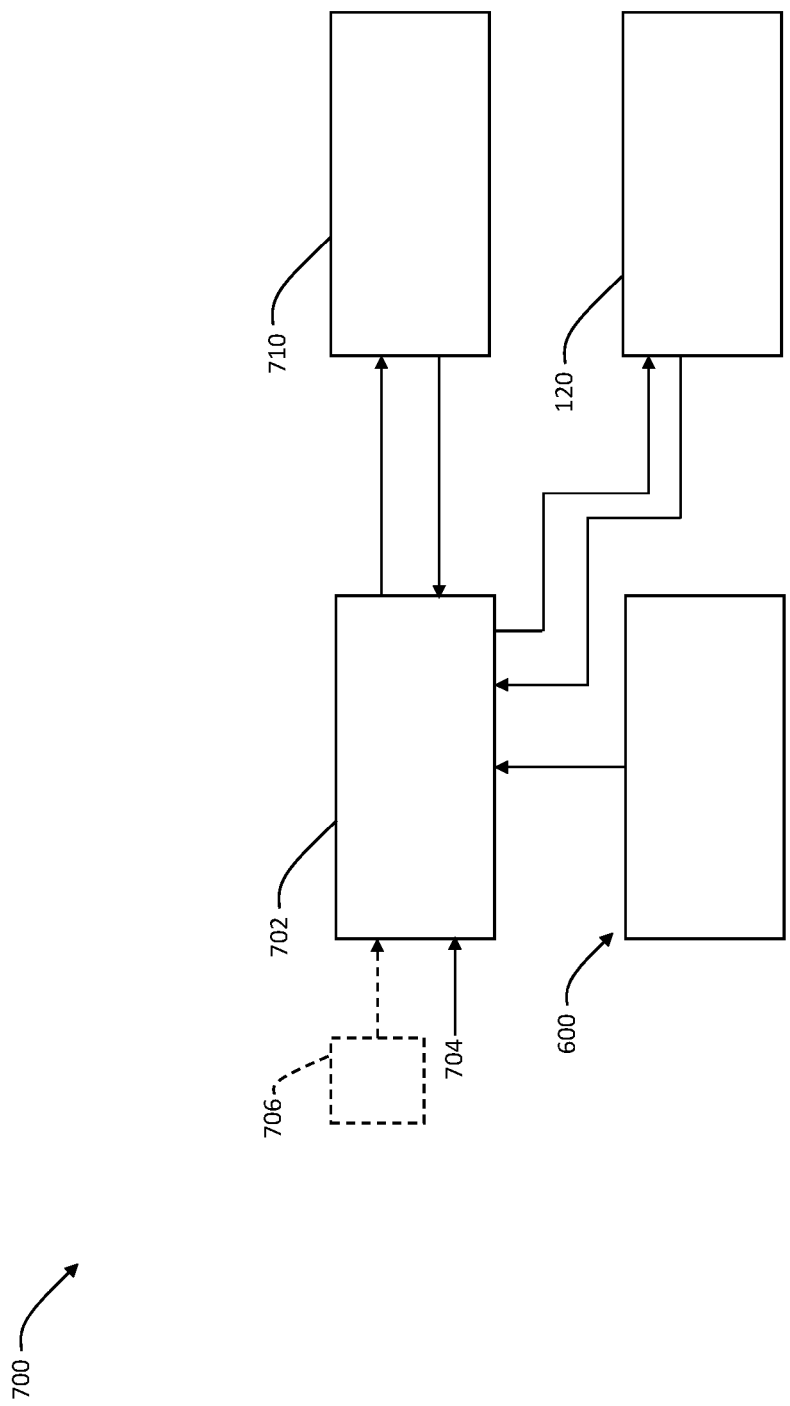
FIG. 7 is a block diagram of a data processing system, according to the present disclosure.

Referring to FIG. 7, a block diagram of the data processing system 700 is shown. The data processing system 700 includes a processing unit 702 that includes memory and other associated blocks that is further defined with reference to FIG. 8, described below. The processing unit 702, as described above, is responsible for a variety of different processing tasks. As an initial matter, the processing unit via an input/output interface, further described in reference to FIG. 8, receives a general plan of panel installation on inside and outside walls of a construction project. This input is identified as 704 in FIG. 7. In addition, as described above, the vision system 600 provides images including all black/white, all color, one black/white and one color, one black/white with depth, or one color with depth to the processing unit 702. As described above, the processing unit 702 analyzes these images and determines i) position of the framed wall 500 (see FIG. 5), the position of each stud 504 (see FIG. 5), the position of each plate 502 and 506 (see FIG. 5), identify and determine position of any deformity 510 (see FIG. position of any electrical and plumbing fixture (not shown), and position of each gangbox 510 (see FIG. 5) and the associated outline 512 (see FIG. 5). Once these features, positions, and dimensions have been determined by the processing unit 702, a plan is generated on how to proceed with fastening the panels 302 (see FIG. 5) to the framed wall 500 (see FIG. 5).

With continued reference to FIG. 7, an optional building information model (BIM) dataset 706 is also shown which provides input to the processing unit 702. A BIM dataset is known to a person having ordinary skill in the art. A BIM dataset includes detailed information about positions of framed walls, including positions of the associated studs, gangboxes, electrical, mechanical, and plumbing fixtures, as well as a variety of other information. The processing unit 702 is adapted to receive the BIM dataset 706 and use that in connection with the vision system 600 as well as feedback sensors (including stud finder and a forces sensor (not shown) as one of the tools $220_i$ (see FIG. 2)) to establish a report of quality of building based on variances between the BIM dataset 706 and the signals received and interpreted from the aforementioned feedback sensors $220_i$ (see FIG. 2) and the vision system 600 representing actual positions of the construction material.

It should be appreciated that in order to match data from the BIM dataset 706 and the position of building material determined by the processing block 702, an association between respective coordinate systems must be created. For example, the BIM dataset 706 may be based on a global coordinate system as well as local coordinate systems. For example, the global coordinate system may include an origin at a corner (not shown) of a room (not shown), and a local coordinate system for each framed wall (e.g., the framed wall 500 (see FIG. 5)) with an origin defined at a lower left corner of each such framed wall. Such coordinate systems must be translated to the coordinate system of the processing unit 702, according to coordinate translation methods known to a person having ordinary skill in the art, prior to determining variations that inform the quality report.

With the fastening plan generated, the processing unit 702 provides data to drivers (not shown) of actuators (e.g., 208, 212, 216, and 218) and receive signals from the feedback sensors, as discussed above, as shown collectively in block 710. Furthermore, the processing unit 702 provides motion requests to the robotic arm 120 and receives communication back from the robotic arm 120. According to one embodiment, the processing unit 702 may be adapted to provide detailed instructions to the robotic arm 120 including low-level actuator information and thus control the robotic arm 120 at a low-level. In this embodiment, the robotic arm may not have a processing block of its own and rely on the processing unit 702 to accomplish all of the necessary calculations of all actuators of the robotic arm 120. In another embodiment, the processing unit 702 cooperates with a separate processing block (not shown) of the robotic arm 120 such that the processing unit 702 provides desired coordinates for the end point of the central attachment arm 202 (see FIG. 2), and rely on the processing block (not shown) of the robotic arm 120 to manage the position calculations.

Figure 8:
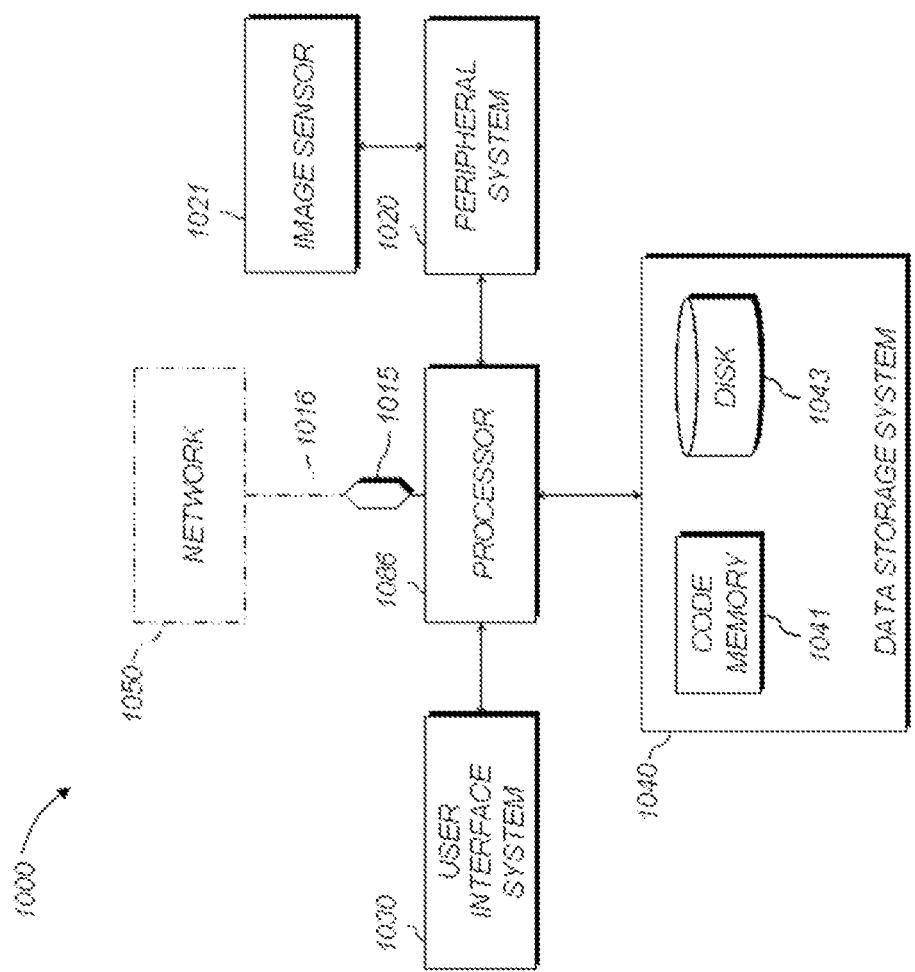
FIG. 8 is an example of a computer system adapted to interface with the data processing system of FIG. 7.

Referring to FIG. 8, an example of a computer system is provided that can interface with the above-discussed data processing system 700. Referring to FIG. 8, a high-level diagram is provided showing the components of an exemplary data-processing system 1000 for analyzing data and performing other analyses described herein, and related components. The system includes a processor 1086 which is part of the processing unit 702 (see FIG. 7), a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM.

The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those having ordinary skill in the art will recognize that numerous modifications can be made to the specific implementations described above. The implementations should not be limited to the particular limitations described. Other implementations may be possible.

The invention claimed is:

1. An autonomous construction robotic system, comprising:
   a processor;
   a robotic arm, the robotic arm adapted to be coupled to a central attachment arm and thereby position the central attachment arm according to a plurality of degrees of freedom;
   a panel handling and fastening system, including
      a panel handling assembly coupled to the central attachment arm and adapted to pick and place a construction panel onto a framed structure, and
      an end effector assembly coupled to the panel handling assembly and adapted to automatically fasten the construction panel to the framed structure according to a predetermined fastening schedule; and
   a vision system having one or more cameras and adapted to provide visual information to the processor associated with the framed structure,
   wherein the processor processes the visual information to automatically determine placement position of the construction panel on the framed structure, and
   wherein once the panel handling assembly has picked and placed the construction panel adjacent framed structure, the end effector assembly is configured to rotate about the construction panel for fastening against the frame structure independent of the panel handling assembly.

2. The autonomous construction robotic system of claim 1, wherein the end effector assembly is configured to rotate the construction panel independent of the panel handling assembly by including and via a first rotational actuator, a first arm, a second rotational actuator, and a second arm, wherein the first rotational actuator is adapted to rotate the first arm, and the second rotational actuator, the second arm.

3. The autonomous construction robotic system of claim 2, the end effector assembly further includes a third rotational actuator adapted to present one or more tools for working the construction panel.

4. The autonomous construction robotic system of claim 3, the end effector assembly further includes a rectilinear actuator coupled to the third rotational actuator and adapted to rectilinearly advance the one or more tools once the third rotational actuator has presented the one or more tools.

5. The autonomous construction robotic system of claim 3, wherein the one or more tools includes a fastening tool adapted to fasten the construction panel to the framed structure.

6. The autonomous construction robotic system of claim 5, wherein the one or more tools further includes a cutting tool adapted to cut a portion of the construction panel while the construction panel is at least partially fastened to the framed structure.

7. The autonomous construction robotic system of claim 6, wherein the one or more tools further includes a stud finder to determine presence of studs once the construction panel is fastened to the framed structure.

8. The autonomous construction robotic system of claim 6, wherein the one or more tools further includes a force sensor adapted to be positioned on a plurality of points on the framed structure, and wherein signal from the force sensor is processed by the processor to determine precise position of the framed structure.

9. The autonomous construction robotic system of claim 1, the vision system includes at least one camera.

10. The autonomous construction robotic system of claim 9, the at least one camera is a red-green-blue (RGB)-Depth camera, adapted to generate RGB images along with depth information of objects in the RGB images.

11. The autonomous construction robotic system of claim 10, wherein the RGB images are analyzed by the processor to determine forbidden zones in the framed structure based on presence of one or more of deformities, presence of electrical fixtures, presence of mechanical fixtures, and presence of plumbing fixtures.

12. The autonomous construction robotic system of claim 11, the at least one camera is at least two single-vision cameras adapted to provide images which when analyzed by the processor produce depth of objects in the images from a predetermined reference point.

13. The autonomous construction robotic system of claim 12, wherein at least one of the at least two single-vision cameras is an RGB camera adapted to generate RGB images.

14. The autonomous construction robotic system of claim 13, wherein the RGB images are analyzed by the processor to determine forbidden zones in the framed structure based on presence of one or more of deformities, presence of electrical fixtures, presence of mechanical fixtures, and presence of plumbing fixtures.

15. The autonomous construction robotic system of claim 1, wherein the processor is adapted to receive a building information modeling (BIM) dataset including data associated with the framed structure, wherein the processor is adapted to compare data from the BIM to the processed data received from the vision system.

16. The autonomous construction robotic system of claim 1, wherein the processor is further adapted to generate a report based on said comparison.

17. The autonomous construction robotic system of claim 8, wherein the processor is adapted to receive a building information modeling (BIM) dataset including data associated with the framed structure, wherein the processor is adapted to compare data from the BIM to the processed signal received from the force sensor.

18. The autonomous construction robotic system of claim 17, wherein the processor is further adapted to generate a report based on said comparison.

19. The autonomous construction robotic system of claim 1, wherein the panel handling assembly includes a plate and a plurality of paneling pickup tools including one or more suction cups coupled to a vacuum pump.

* * * * *